United States Patent [19]
Omura

[11] Patent Number: 5,161,113
[45] Date of Patent: Nov. 3, 1992

[54] CCD OUTPUT SIGNAL PROCESSING METHOD AND APPARATUS

[75] Inventor: Katsuyuki Omura, Yokohama, Japan

[73] Assignee: Ricoh Company, Ltd., Tokyo, Japan

[21] Appl. No.: 551,005

[22] Filed: Jul. 11, 1990

[30] Foreign Application Priority Data

Jul. 13, 1989 [JP] Japan ................................ 1-181258

[51] Int. Cl.$^5$ ........................ G06F 15/20; H03B 1/04
[52] U.S. Cl. ................................ 364/486; 307/542; 364/574; 364/576
[58] Field of Search ............ 307/353, 542, 549; 364/485, 723, 724.1, 724.16, 725, 572, 574, 576; 377/58, 60, 63; 368/183

[56] References Cited

U.S. PATENT DOCUMENTS

| | | | |
|---|---|---|---|
| 4,330,753 | 5/1982 | Davy | 377/63 |
| 4,430,723 | 2/1984 | Tanikawa et al. | 377/63 |
| 4,523,291 | 6/1985 | Giubbolini et al. | 364/485 |
| 4,791,577 | 12/1988 | Winter | 364/574 |
| 4,886,986 | 12/1989 | Watanabe | 307/542 |
| 4,954,961 | 9/1990 | Fontanes et al. | 364/725 |

FOREIGN PATENT DOCUMENTS

62-42104 8/1988 Japan.

Primary Examiner—Kevin J. Teska
Attorney, Agent, or Firm—Oblon, Spivak, McClelland, Maier & Neustadt

[57] ABSTRACT

A CCD output signal processing method includes the steps of sampling a CCD output signal supplied from a CCD in synchronism with a transfer clock to thereby generate sampled CCD output data within an n-th section corresponding to one pixel (n is an arbitrary integer), expanding the sampled CCD output data to a Fourier series which has a basic waveform having aa period substantially corresponding to a reciprocal of a frequency of the transfer clock, and calculating an amplitude of the basic waveform from first-order Fourier coefficients included in the Fourier series, the amplitude of the basic waveform being a corrected amplitude of the CCD output signal supplied from the CCD. There is provided a CCD output signal processing apparatus which implements the above-mentioned method.

10 Claims, 3 Drawing Sheets

CCD OUTPUT SIGNAL PROCESSING METHOD AND APPARATUS

BACKGROUND OF THE INVENTION

The present invention generally relates to a method for processing an output signal of a charge-coupled device and an apparatus which implements the same. The present invention is suitable for application to a facsimile machine, an image scanner or the like.

Recently, a charge-coupled device (CCD) has widely been used. FIG. 1 illustrates a charge-coupled device which includes a CCD transfer channel and an output circuit. A CCD transfer channel 1 has a plurality of transfer electrodes 5. A detection diode 4 is provided in the vicinity of a transfer electrode 2. The detection diode 4 detects a signal charge transferred in synchronism with transfer clocks $\phi_1$ and $\phi_2$ and converts the signal charge into an output voltage. The transfer clocks $\phi_1$ and $\phi_2$ have an identical frequency and the mutually inverted phase. The signal charge transferred in synchronism with the transfer clocks $\phi_1$ and $\phi_2$ passes through the detection diode 4 for every period of each of the transfer clocks $\phi_1$ and $\phi_2$, so that the detection voltage drawn across the detection diode 4 varies on the basis of the current passing therethrough. A change in the detection voltage is applied to a buffer circuit 6, which outputs an output voltage Vs. The buffer circuit 6 is composed of a transistor and a resistor connected in series between a positive power source $V_{DD}$ and ground. A reset transistor 7 is connected between another positive power source V and the detection diode 4. A reset pulse $\phi_r$ which has a period identical to that of the transfer pulses $\phi_1$ and $\phi_2$ is applied to the gate of the reset transistor 7. When the reset transistor 7 is turned ON, the potential of the detection diode 4 is reset to be equal to the reference voltage V. The output circuit is formed on a common semiconductor substrate together with the CCD transfer channel 1. The arrangement shown in FIG. 1 is disclosed in Japanese Laid-Open Patent Application No. 63-208375. The output circuit shown in FIG. 1 is known as an on-chip-gate charge integrated type output circuit.

The on-chip-gate charge integrated type output circuit generates a reset noise caused by the reset transistor 7, as will described below. FIG. 2 is a waveform diagram of the output signal Vs from the output circuit. During time between $t_0$ and $t_1$, the reset pulse $\phi_r$ is being applied to the gate of the reset transistor 7 so that it is turned ON. The potential of the detection diode 4 is increased up to the drain voltage V of the reset transistor 7. At time $t_1$, the reset transistor 7 is turned OFF. Thereby, the potential of the detection diode 4 becomes equal to a constant reference voltage Vo, which is based on a gate capacitance 8 equal to the sum of the capacitances of the detection diode 4 and the buffer circuit 6 as well as a gate-source capacitance of the reset transistor 7. At time $t_3$, a charge is transferred to and passes through the detection diode 4 so that the output voltage Vs is obtained.

While the reset transistor 7 is conducting during the time between $t_0$ and $t_1$, the reset transistor 7 generates a reset noise En having a certain intensity. The reference voltage Vo is affected by the reset noise En so that it is varied. As shown in FIG. 2, each time the reset pulse $\phi_r$ is applied to the gate of the reset transistor 7, the reference voltage Vo is varied within a range between Vo ± Vn due to the presence of the reset noise En so that a signal-to-noise ratio (S/N ratio) of the output voltage Vs is deteriorated. It will be noted that Vn is the above-mentioned reset noise.

In addition to the reset transistor 7, the buffer circuit 6 shown in FIG. 1 is also a noise source which generates random noise. Random noise Er caused by the buffer circuit 6 has an amplitude which is inversely proportional to a reciprocal of a frequency f thereof, and is thus called 1/f noise.

In order to reduce the influence of the reset noise Vn and 1/f noise and improve the S/N ratio, a double correlation sampling method is known which the reference voltage Vo is clamped at a fixed potential at time $t_2$ and the output voltage Vs is sampled at time $t_4$.

However, the double correlation sampling method is capable of eliminating only low-frequency components of the reset noise En and the 1/f noise. Thus, the reference voltage Vo and the output voltage Vs are affected by random noises having no mutual relationship so that the S/N ratio of the output signal obtained by the double correlation sampling method Vs is deteriorated. In this case, random noises are 1/f noise or other high-frequency components.

That is, the double correlation sampling method is not capable of eliminating noises other than low-frequency components so that the S/N ratio of the output signal is deteriorated. From this viewpoint, there is a need to provide an improved process for eliminating all random noise components containing the reset noise and 1/f noise from the CCD output signal.

SUMMARY OF THE INVENTION

It is a general object of the present invention to provide an improved method of processing a CCD output signal and an apparatus which implements the same in which the aforementioned disadvantages are eliminated.

A more specific object of the present invention is to provide a CCD output signal processing method capable of eliminating all random noise components from the CCD output signal.

The above-mentioned objects of the present invention are achieved by a CCD output signal processing method, comprising the steps of:

a) sampling a CCD output signal supplied from a CCD in synchronism with a transfer clock to thereby generate sampled CCD output data within an n-th section corresponding to one pixel (n is an arbitrary integer);

b) expanding the sampled CCD output data to a Fourier series which has a basic waveform having a period substantially corresponding to a reciprocal of a frequency of the transfer clock; and c) calculating an amplitude of the basic waveform from first-order Fourier coefficients included in the Fourier series, the amplitude of the basic waveform being a corrected amplitude of the CCD output signal supplied from the CCD.

Another object of the present invention is to provide an apparatus using the above-mentioned method.

This object of the present invention is achieved by a CCD output signal processing apparatus comprising:

sampling means for sampling a CCD output signal supplied from a CCD in synchronism with a transfer clock to thereby generate sampled CCD output data within an n-th section corresponding to one pixel (n is an arbitrary integer);

first calculating means, coupled to the sampling means, for expanding the sampled CCD output data to a Fourier series which has a basic waveform having a period substantially corresponding to a reciprocal of a frequency of the transfer clock; and second calculating means, coupled to the first calculating means and the sampling means, for calculating an amplitude of the basic waveform from first-order Fourier coefficients included in the Fourier series, the amplitude of the basic waveform being a corrected amplitude of the CCD output signal supplied from the CCD.

DESCRIPTION OF THE PREFERRED EMBODIMENTS

Figure 1:
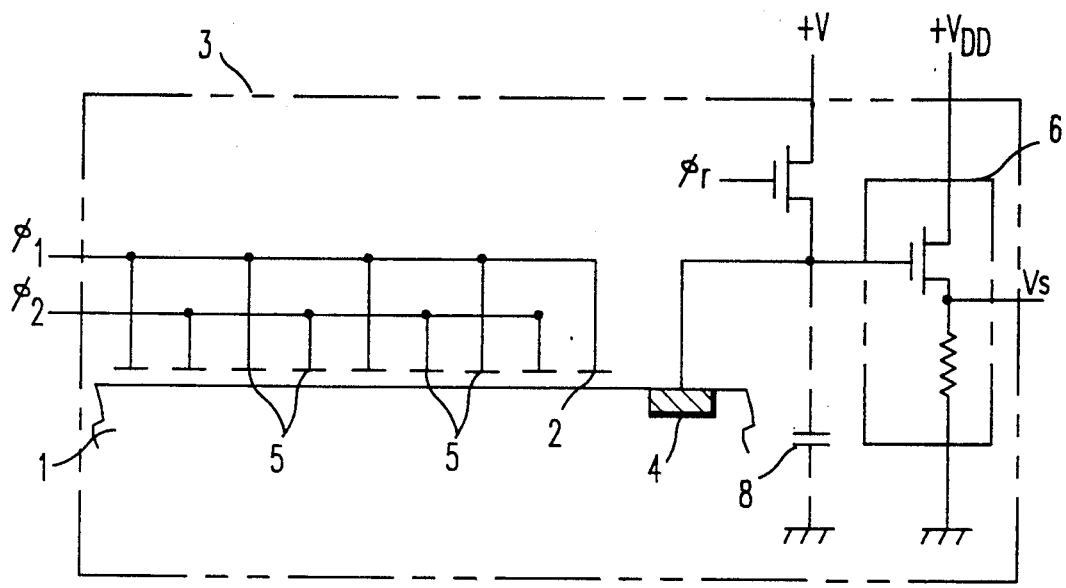
FIG. 1 is a circuit diagram of a conventional CCD.
Figure 2:
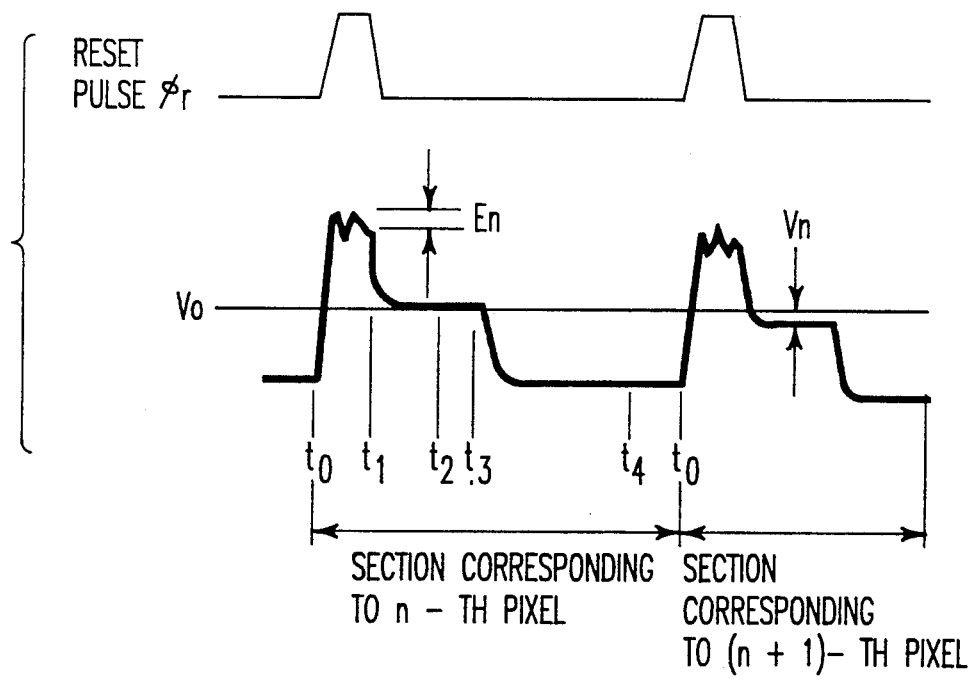
FIG. 2 is a waveform diagram of an output signal of the CCD shown in FIG. 1.

First, the waveform of the CCD output signal from the CCD 3 shown in FIG. 1 will be studied with reference to FIG. 2. A waveform section corresponding to each of N pixels of the CCD 3 is numbered 1-N. The period of the waveform coincides with the period (frequency) $f_0$ of each of the transfer clock pulses $\phi_1$ and $\phi_2$. It is now assumed that the expansion of a Fourier transfer having a basic waveform of the period $f_0$ related to t within the n-th section of the CCD output voltage V(t) is as follows:

$$Vn(t) = a_{n0}/2 + \sum_k a_{nk}\cos 2\pi k f_0 t + \sum_k b_{nk}\sin 2\pi k f_0 t \quad (1)$$

The high-order terms of formula (1) result from random noises, such as the reset noise caused by the reset transistor 7 (FIG. 1) and 1/f noise. A desired CCD output voltage Vn'(n) with respect to the n-th pixel corresponds to the basic waveform $f_0$ component (which is obtained for k=1) related to the n-th pixel shown in FIG. 2. The basic waveform $f_0$ component is expressed as follows:

$$Vn'(n) = a_{n1}\cos 2\pi f_0 t + b_{n1}\sin 2\pi f_0 t \quad (2)$$

The amplitude Vamp(n) of the basic waveform $f_0$ component is written by $$\text{Vamp}(n) = (a_{n1}^2 + b_{n1}^2)^{\frac{1}{2}} \quad (3)$$

That is, the amplitude Vamp(n) of the desired CCD output signal is obtained from the first-order Fourier coefficients which are obtained by expanding the n-th section of the CCD output signal waveform to the Fourier series by the frequency $f_0$ of the transfer clock. In other words, the amplitude Vamp(n) of the basic waveform $f_0$ component is obtained from formula (3) by determining the first-order Fourier coefficients $a_{n1}$ and $b_{n1}$. Signal components having frequencies which are less than $f_0$ (containing D.C. components) are eliminated when formula (1) is defined.

A description will now be given of a procedure for extracting only the basic waveform $f_0$ component from formula (1). The procedure ulitizes the orthogonal property of the triganometric function, that is, $$\int_t^{t+T} \cos 2\pi mft \cos 2\pi nft \cdot dt = \quad (4)$$

$$\int_t^{t+T} \sin 2\pi mft \sin 2\pi nft \cdot dt = 2/T \cdot \delta_{mn}$$

$$\int_t^{t+T} \cos 2\pi mft \sin 2\pi nft \cdot dt = 0 \quad (5)$$

where $\delta_{mn}$ is the Kronecker's symbol and T=1/f.

An integration within section $T_0[t, t+1/f_0]$ is described as follows.

$$C(n) = \int^{T_0} Vn(t) \cos 2\pi f_0 \cdot dt \quad (6)$$

$$S(n) = \int^{T_0} Vn(t) \sin 2\pi f_0 \cdot dt \quad (7)$$

By substituting formula (1) for formulas (6) and (7) and taking into consideration formulas (4) and (5), $$C(n) = a_{n1} \quad (8)$$

$$S(n) = b_{n1} \quad (9)$$

That is, the amplitude Vamp(n) of the desired CCD output signal is $$\text{Vamp}(n) = [C(n)^2 + S(n)^2]^{\frac{1}{2}} \quad (10)$$

By expanding t of formula (1) to a series of discrete values and by expanding the integrations of formulas (6) and (7) to $\Sigma$, the following formulas are obtained $$Vn(i\Delta t) = a_{n0}/2 + \sum_k a_{nk}\cos 2\pi k f_0 i\Delta t + \sum_k b_{nk}\sin 2\pi k f_0 i\Delta t \quad (11)$$

$$C(n) = \sum_{i=0}^{M-1} Vn(i\Delta t)\cos 2\pi f_0 i\Delta t \quad (12)$$

$$S(n) = \sum_{i=0}^{M-1} Vn(i\Delta t)\sin 2\pi f_0 i\Delta t \quad (13)$$

where $M\Delta t = T_0 = 1/f_0$.

In short, the CCD output signal is sampled in each of the N sections corresponding to N pixels at intervals $\Delta t$ so that M data pieces are formed. Formulas (10)-(13) are applied independently to M data pieces of each of the N pixels so that the amplitude Vamp(n) is obtained. It will be noted that amplitude Vamp(n) is the desired CCD signal. Since $f_0$ and $\Delta t$ contained in the cosine and sine terms, the sine and cosine terms can be calculated as weighting functions.

Figure 3:
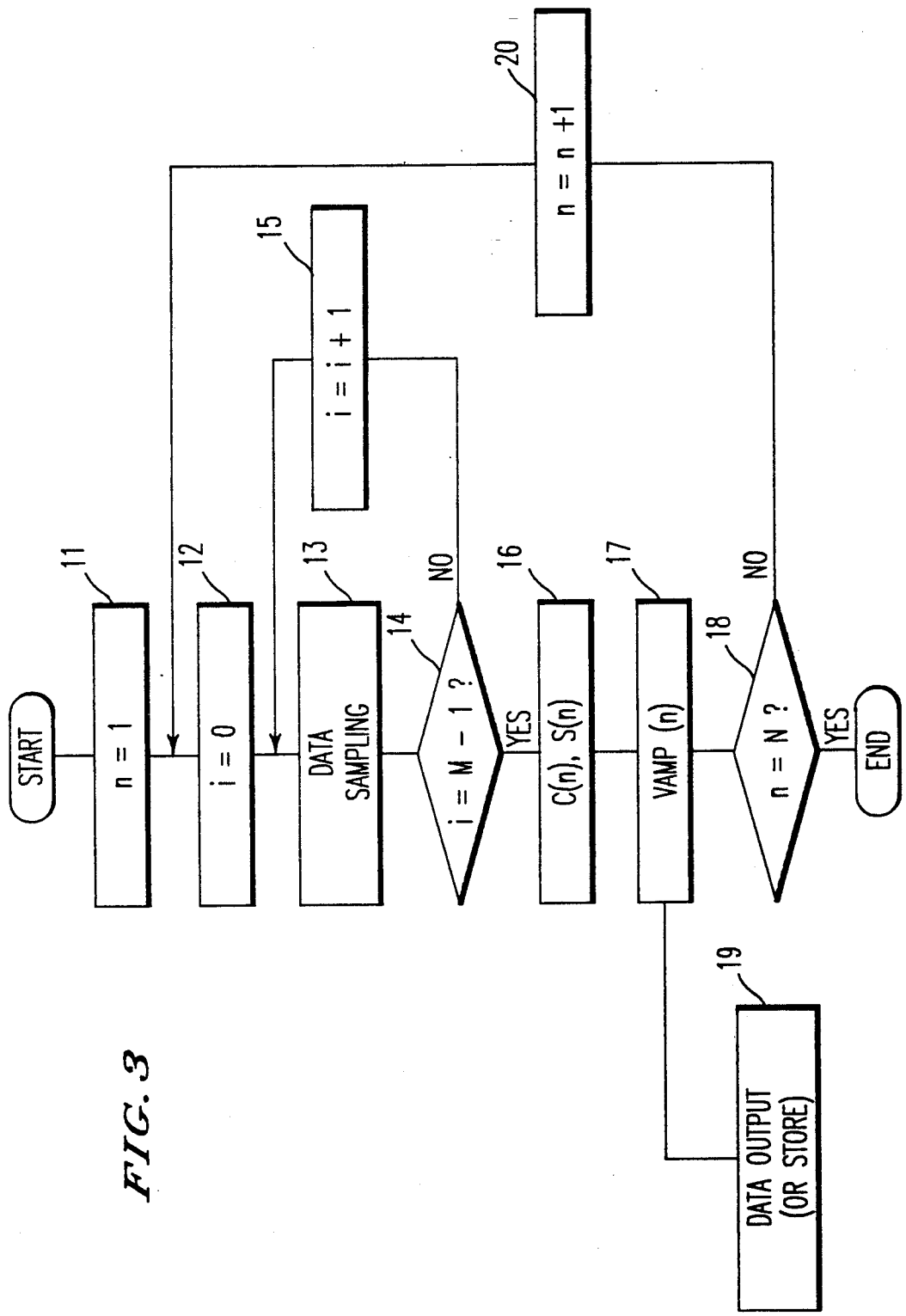
FIG. 3 is a flowchart of a method according to a preferred embodiment of the present invention.

Referring to FIG. 3, there is illustrated a case where M=4. First, n is set equal to 1 (step 11). Next, i is set equal to 0 (step 12). The CCD output signal is sampled (step 13). Then, it is determined whether or not i is equal to M−1 (step 14). When the result at step 14 is YES, the C(n) and S(n) are calculated by using formulas (12) and (13) (step 16). On the other hand, when it is determined, at step 14, that i is not equal to M−1, i is incremented by 1 and the data sampling procedure is carried out (step 16). At step 17, the amplitude Vamp(n) is calculated by using formula (13) (step 17). The amplitude Vamp(n) is output to a next-stage circuit or stored in a memory (step 19). At step 18, it is determined whether or not n is equal to N. When the result at step 18 is YES, the procedure ends. On the other hand, when the result at step 18 is NO, n is incremented by 1 (step 20), and the procedure returns to step 12.

Figure 4:
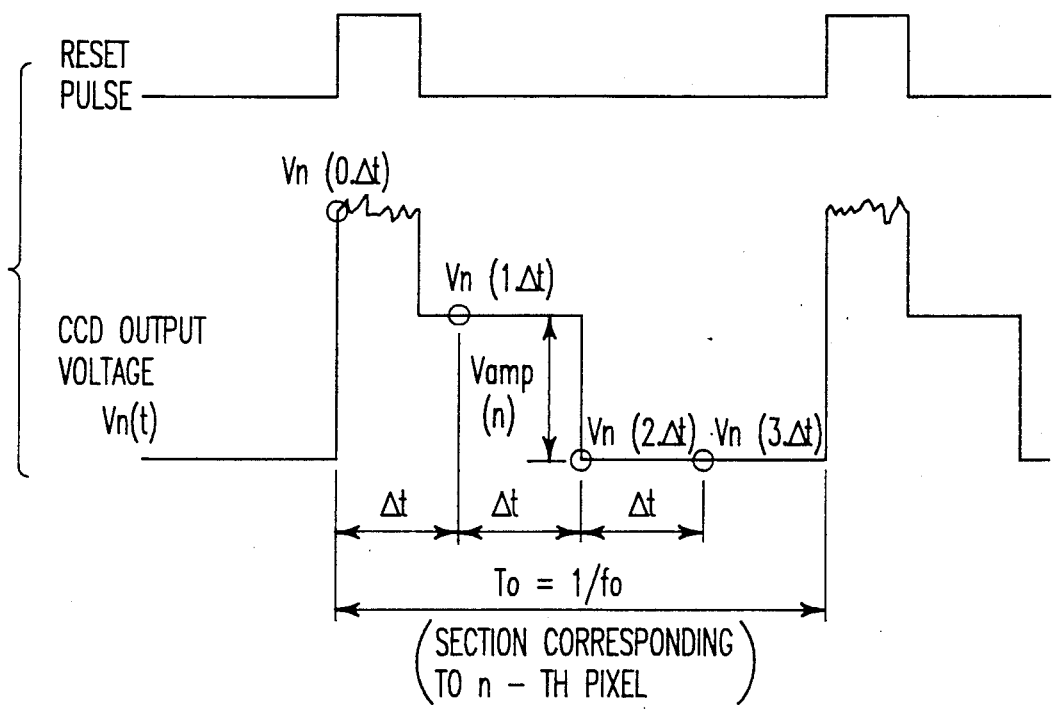
FIG. 4 is a waveform diagram illustrating how to process the CCD output signal according to the procedure shown in FIG. 3.

FIG. 4 is a waveform diagram of the CCD output voltage Vn(t) which is obtained by processing the output voltage Vs shown in FIG. 1 in accordance with the procedure shown in FIG. 3.

Figure 5:
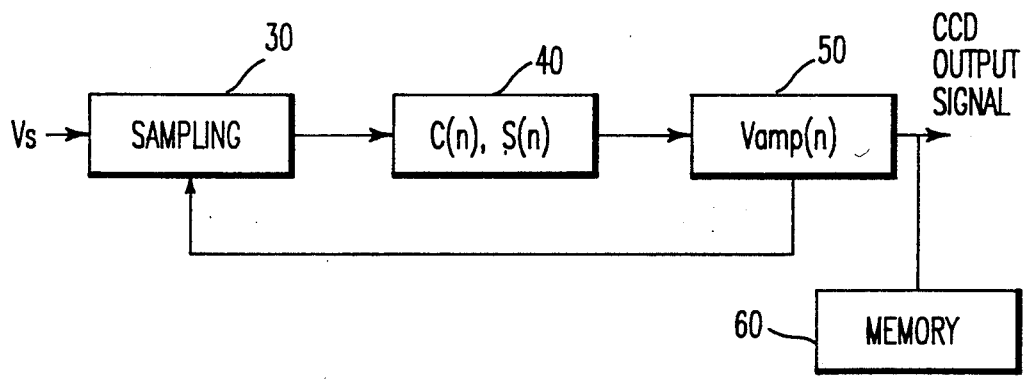
FIG. 5 is a block diagram of a CCD output signal processing apparatus which implements the procedure shown in FIG. 3.

FIG. 5 is a block diagram of a CCD output signal processing apparatus which implements the procedure shown in FIG. 4. The apparatus shown in FIG. 5 is made up of a sampling circuit 30, a calculation circuit 40, a calculation circuit 50 and a memory 60. The sampling circuit 30 receives the CCD output signal Vs shown in FIG. 1 and executes the procedure at step 13 shown in FIG. 3. The calculation circuit 40 receives sampled data which is produced and output by the sampling circuit 30, and executes the procedure at steps 14, 15 and 16 so that C(n) and S(n) defined by formulas ((12) and (13)) are obtained. The calculation circuit 50 receives C(n) and S(n) which are calculated and output by the calculation circuit 40, and executes the procedures at steps 17, 18, 19 and 20 so that Vamp(n) defined by formula (10) is obtained. The output Vamp(n) may be output to a next stage circuit or stored in memory 60.

The present invention is not limited to the specifically disclosed embodiments, and variations and modifications may be made without departing from the scope of the present invention.

What is claimed is:

1. A CCD output signal processing method for processing a CCD output signal supplied from a CCD, comprising the steps of:
   a) detecting a signal charge transferred in synchronism with a transfer clock;
   b) passing said signal charge through a detection diode to convert said signal charge to a detection voltage;
   c) producing a first CCD output signal having a random noise component;
   d) sampling said first CCD output signal supplied from the CCD in synchronism with the transfer clock to thereby generate a plurality of sampled CCD output data pieces within an n-th section corresponding to one pixel (n is an arbitrary integer);
   e) expanding said sampled CCD output data pieces to a Fourier series, wherein the Fourier series has a basic waveform having a period substantially corresponding to a reciprocal of a frequency of said transfer clock;
   f) calculating an amplitude of said basic waveform from first-order Fourier coefficients included in said Fourier series, said amplitude of said basic waveform being a corrected amplitude of said first CCD output signal supplied from the CCD; and
   g) producing a second CCD output signal, reconstructed from said amplitude of said basic waveform, having said random noise component eliminated.

2. A CCD output signal processing method as claimed in claim 1, wherein:
   the step (d) samples said CCD output signal at intervals $\Delta t$ to thereby generate M data pieces; and
   the step (f) calculates said amplitude by using the following two formulas $$Vamp(n) = [C(n)^2 + S(n)^2]^{\frac{1}{2}}, \text{ and}$$

$$Vn(i\Delta t) = a n_0/2 + \sum_k a_{nk}\cos 2\pi k f_0 i\Delta t + \sum_k b_{nk}\sin 2\pi k f_0 i\Delta t$$

where Vamp(n) is said amplitude and C(n), S(n) are said first-order Fourier coefficients, and Vn(i$\Delta t$) is an expansion of said Fourier series where a and b correspond to first order Fourier coefficients and i and k are indexes.

3. A CCD output signal processing method as claimed in claim 2, wherein $M\Delta t = T_0 = 1/f_0$ where $T_0$ is the period of said basic waveform and $f_0$ is the frequency of said transfer clock.

4. A CCD output signal processing method as claimed in claim 1, further comprising the step of storing said amplitude for said n-th section into a memory.

5. A CCD output signal processing apparatus comprising:
   a CCD for producing a first CCD output signal having a random noise component;
   sampling means for sampling said first CCD output signal supplied from said CCD in synchronism with a transfer clock to thereby generate sampled CCD output data with in an n-th section corresponding to one pixel (n is an arbitrary integer);
   first calculating means, coupled to said sampling means, for expanding said sampled CCD output data to a Fourier series, wherein the Fourier series has a basic waveform having a period substantially corresponding to a reciprocal of a frequency of said transfer clock;
   second calculating means, coupled to said first calculating means and said sampling means, for calculating an amplitude of said basic waveform from first-order Fourier coefficients included in said Fourier series, said amplitude of said basic waveform being a corrected amplitude of said first CCD output signal supplied from the CCD; and
   producing means for producing a second CCD output signal, reconstructed from said amplitude of said basic waveform, having said random noise component eliminated.

6. A CCD output signal processing apparatus as claimed in claim 5, wherein:
   said sampling means samples in CCD output signal at intervals $\Delta t$ to thereby generate M data pieces; and
   said second calculating means calculates said amplitude by using the following two formulas $$Vamp(n) = [C(n)^2 + S(n)^2]^{\frac{1}{2}}, \text{ and}$$

$$Vn(i\Delta t) = a n_0/2 + \sum_k a_{nk}\cos 2\pi k f_0 i\Delta t + \sum_k b_{nk}\sin 2\pi k f_0 i\Delta t$$

where Vamp(n) is said amplitude and C(n), S(n) are said first-order Fourier coefficients, and Vn(i$\Delta t$) is an expansion of said Fourier series where a and b correspond to first order Fourier coefficients and i and k are indexes.

7. A CCD output signal processing apparatus as claimed in claim 6, wherein $M\Delta t = T_0 = 1/f_0$ where $T_0$ is the period of said basic waveform and $f_0$ is the frequency of said transfer clock.

8. A CCD output signal processing apparatus as claimed in claim 5, further comprising means for storing said amplitude for said n-th section into a memory.

9. A CCD output signal processing method for removing random noise from a CCD output signal supplied from a CCD for an imaging device, comprising the steps of:

detecting a signal charge transferred in synchronism with a transfer clock;

passing said signal charge through a detection diode to convert said signal charge to a detection voltage;

producing a first unenhanced CCD output signal having a random noise component;

sampling said first unenhanced CCD output signal supplied from the CCD in synchronism with the transfer clock to thereby generate a plurality of sampled CCD output data pieces corresponding to said first unenhanced CCD output signal within an n-th section corresponding to one pixel, wherein n is an arbitrary integer;

expanding said sampled CCD output data pieces corresponding to said first unenhanced CCD output signal to a Fourier series, wherein the Fourier series has a basic waveform having a period substantially corresponding to a reciprocal of a frequency of said transfer clock;

calculating an amplitude of said basic waveform from first-order Fourier coefficients included in said Fourier series, said amplitude of said basic waveform being a corrected amplitude of said first unenhanced CCD output signal supplied from the CCD; and producing, for use in said imaging device, a second enhanced CCD output signal, reconstructed from said amplitude of said basic waveform, having said random noise component removed in order to produce an improved image signal.

10. A CCD output signal processing apparatus for removing random noise from a CCD output signal representing a pixel in an imaging device, comprising:

a CCD for producing a first unenhanced CCD output signal having a random noise component;

means for sampling said first unenhanced CCD output signal supplied from said CCD in synchronism with a transfer clock to thereby generate a plurality of sampled CCD output data pieces corresponding to said first unenhanced CCD output signal within an n-th section corresponding to one pixel, wherein n is an arbitrary integer;

first calculating means, coupled to said sampling means, for expanding said sampled first unenhanced CCD output signal data to a Fourier series, wherein the Fourier series has a basic waveform having a period substantially corresponding to a reciprocal of a frequency of said transfer clock;

second calculating means, coupled to said first calculating means for calculating an amplitude of said basic waveform from first-order Fourier coefficients included in said Fourier series, said amplitude of said basic waveform being a corrected amplitude of said first unenhanced CCD output signal supplied from the CCD; and means for producing a second enhanced CCD output signal, reconstructed from said amplitude of said basic waveform, for use in said imaging device, having said random noise component removed in order to produce an improved image signal.

* * * * *